(12) United States Patent
Wang et al.

(10) Patent No.: US 7,540,697 B2
(45) Date of Patent: Jun. 2, 2009

(54) COMPUTER ASSISTED DETECTING AND RESTRAINING SYSTEMS FOR CUTTING TOOL CHATTER

(75) Inventors: Shih-Ming Wang, Taipei County (TW); Hsiang-Yung Hsieh, Taoyuan County (TW)

(73) Assignee: Chung Yuan Christian University, Taoyuan County (TW)

( * ) Notice: Subject to any disclaimer, the term of this patent is extended or adjusted under 35 U.S.C. 154(b) by 608 days.

(21) Appl. No.: 11/258,771

(22) Filed: Oct. 25, 2005

(65) Prior Publication Data
US 2006/0188351 A1    Aug. 24, 2006

(30) Foreign Application Priority Data
Feb. 23, 2005    (TW) .............................. 94105390 A

(51) Int. Cl.
*B23Q 11/00*    (2006.01)
(52) U.S. Cl. ...................................... 409/141
(58) Field of Classification Search ............. 409/131, 409/141, 186, 187, 193, 194, 207; 82/903, 82/904; 408/143; 700/174, 175, 177, 280; 340/683; 73/430, 514.12
See application file for complete search history.

(56) References Cited

U.S. PATENT DOCUMENTS

| | | | | |
|---|---|---|---|---|
| 5,170,358 A | * | 12/1992 | Delio | .......................... 700/177 |
| 5,518,347 A | * | 5/1996 | Cobb, Jr. | ..................... 409/141 |
| 5,523,701 A | * | 6/1996 | Smith et al. | .................. 324/772 |
| 5,700,116 A | * | 12/1997 | Cobb, Jr. | ..................... 409/141 |
| 5,784,273 A | * | 7/1998 | Madhavan | .................... 700/71 |
| 5,957,016 A | * | 9/1999 | Segalman et al. | ............ 82/1.11 |
| 6,085,121 A | * | 7/2000 | Stern | ........................... 700/175 |
| 6,189,426 B1 | * | 2/2001 | Segalman et al. | ............. 82/117 |
| 6,241,435 B1 | * | 6/2001 | Huang et al. | ................. 409/141 |
| 6,349,600 B1 | * | 2/2002 | Davies et al. | ................. 73/660 |
| 6,993,410 B2 | * | 1/2006 | Esterling | ..................... 700/177 |
| 2002/0146296 A1 | * | 10/2002 | Schmitz et al. | ............. 409/131 |
| 2005/0021265 A1 | * | 1/2005 | Esterling | ..................... 702/76 |

* cited by examiner

*Primary Examiner*—Dana Ross
(74) *Attorney, Agent, or Firm*—Quintero Law Office

(57) ABSTRACT

A computer assisted detecting and restraining system for cutting tool chatter. The system comprises a network monitor system, a signal extraction system, a chatter detection system, and a chatter restraint system. The network monitor system monitors a machine tool and receives audio caused during a cutting process. The signal extraction system extracts vibration displacement signals generated during the cutting process converts the vibration displacement signals to digital signals and transfers the digitalized signals. The chatter detection system receives the digitalized vibration displacement signals and sends a control command when the signals are high frequency signals. The chatter restraint system receives the control command and adjusts rotation rates of a spindle of the machine tool accordingly.

9 Claims, 17 Drawing Sheets
(3 of 17 Drawing Sheet(s) Filed in Color)

COMPUTER ASSISTED DETECTING AND RESTRAINING SYSTEMS FOR CUTTING TOOL CHATTER

BACKGROUND

The invention relates to monitor systems, and more particularly, to computer assisted detecting and restraining systems for cutting tool chatter.

[Machine tool] is a manufacture machine for facility manufacturing, driven by a power source and manufacturing metallic workpieces using physical, chemical, or other processes for formation. Manufacturing methods comprise milling or grinding metallic workpieces for desired shape, size, and surface precision. Manufacturing technologies for machine tools have rapidly developed, comprising high speed milling (HSC) and high speed feeding (HSF) methods.

HSC method can enhance metal removal rate to reduce process time and cost and result in higher surface roughness. To harmony with running efficiency of a machine tool, milling parameters can only be set within a fixed range, or the machine tool generate chatters easily during milling operations. As chatter occurs, workpieces may be unusable or damaged, and even the machine tool is damaged. Current detecting and suppressing methods for chatters change structure features based on structure mode of a machine tool or utilize related controls.

Hualizhong Li and Xiaoping Li disclose [MODELING AND SIMULATION OF CHATTER IN MILLING USING A PREDICTIVE FORCE MODEL], simulating and predicting milling force degrees and chatter states to create a dynamic milling model.

S. K. KIM and S-Y. Lee disclose [CHATTER PREDICTION OF END MILLING IN A VERTICAL MACHINING CHATTER], creating a dynamic milling model according to geometrical characteristics of milling tools affecting milling force to predict whether chatters occur to an vertical milling tool.

K. J. Lin and K. E. Routh disclose [OPTIMAL PASSIVE VIBRATION CONTROL OF CUTTING PROCESS STABILITY IN MILLING], designing damper using an optimum control method to suppress chatters, defining an objection function according to milling depth, milling width, and spindle rate to obtain optimum m, c, and k values of a dynamic structure of the damper.

Jingchuan Pan, Chun-Yi Su, and Yury Stepanenko disclose [MODELING AND ROBUST ADAPTIVE CONTROL OF METAL CUTTING MECHANICAL SYSTEM], designing a lathe tool seat using a robust adaptive control method and regulating a feed amount of the lathe tool using an actuator to change milling thickness for chatter suppression.

As described, many other chatter suppression methods are provided. Current chatter suppression methods, however, cannot detect and suppress chatters as being occurring immediately, incapable of improving surface precision. Thus, an effective method for suppressing chatters is desirable.

SUMMARY

Computer assisted detecting and restraining systems for cutting tool chatter are provided. An embodiment of such a system comprises a network monitor system, a signal extraction system, a chatter detection system, and a chatter restraint system. The network monitor system further comprises a network camera and an audio module. The network camera monitors the machine tool. The audio module receives audio caused as the machine tool cutting a workpiece. The signal extraction system further comprises a displacement meter and a dynamic signal extraction box. The displacement meter extracts vibration displacement signals generated as a spindle of the machine tool cutting the workpiece. The dynamic signal extraction box converts the vibration displacement signals to digital signals and transfers the digitalized vibration displacement signals. The chatter detection system receives the digitalized vibration displacement signals, determines whether the signals are high frequency signals, if the vibration displacement signals are high frequency signals, determines whether signal points generated based thereon are located in a stable area derived using a sliding function, and, if the signal points are located outside the stable area, sends a control command. The chatter restraint system receives the control command and adjusts rotation rates of the spindle of the machine tool accordingly.

BRIEF DESCRIPTION OF THE DRAWINGS

The file of this patent contains at least one drawing/photograph executed in color. Copies of this patent with color drawing(s)/photograph(s) will be provided by the Office upon request and payment of the necessary fee.

The invention can be more fully understood by reading the subsequent detailed description and examples of embodiments thereof with reference made to the accompanying drawings, wherein.

DETAILED DESCRIPTION

Figure 1:
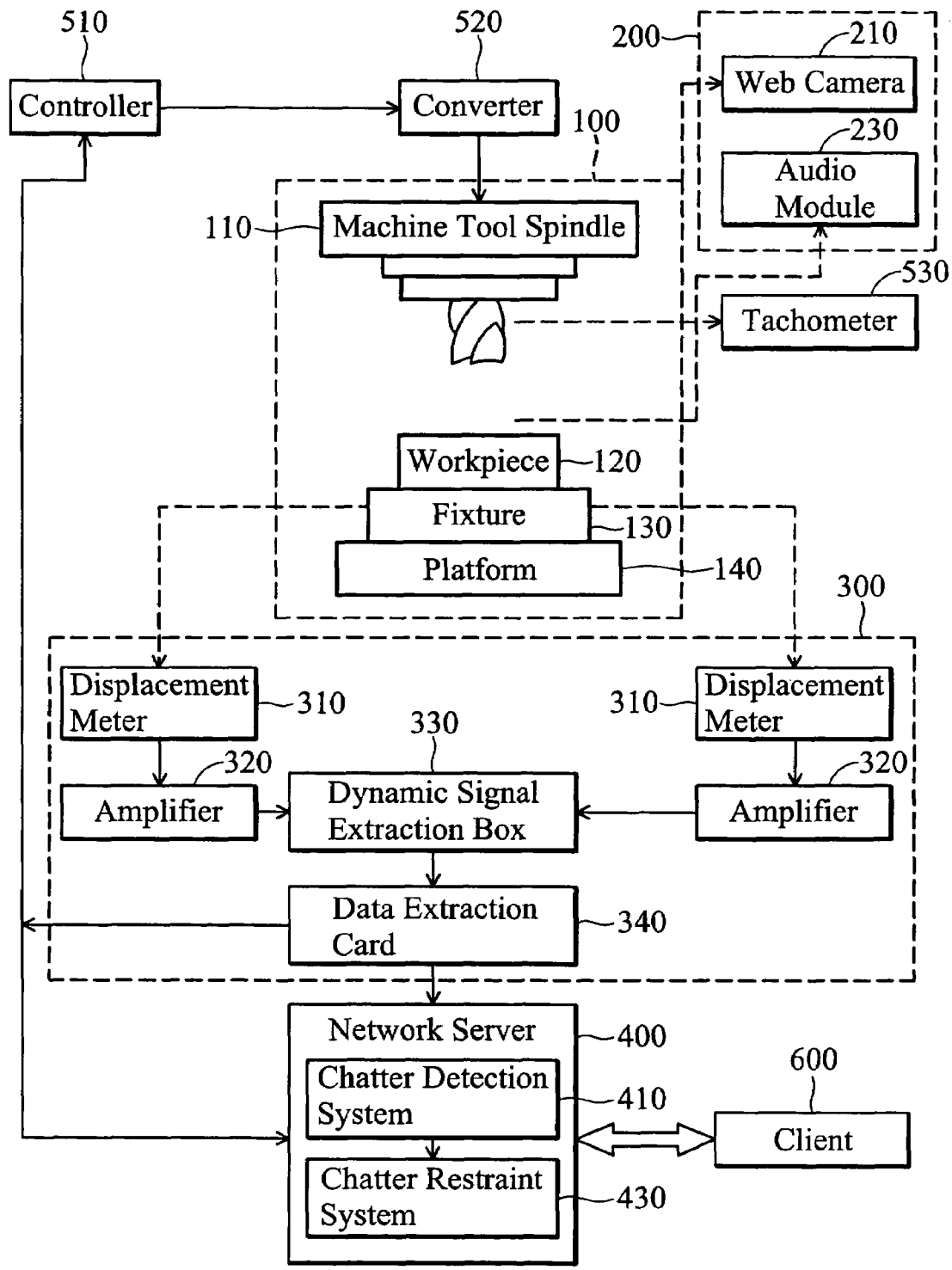
FIG. 1 is a schematic view of an embodiment of an milling system model.

The invention discloses a detecting and suppressing control method for milling tool chatter.

Chatters generated by a machine tool comprise, but is not limited to, forced vibrations and self-excited vibrations in this embodiment of the invention. Any other type of chatters can be detected and suppressed using the method of the invention. Conventionally, chatters are determined using Fast Fourier Transformation (FFT), determining whether received audio signals from a sensor are high frequency signals. Such a method is not adapted to milling processes with high rotational rate, low feeding, and less milling depth. Feed rate per edge is far less than a standard value, such that a milling tool is idling easily to rub on a workpiece repeatedly, generating high frequency friction signals. Erroneous judgments thus occur if chatters are determined using only FFT.

As described, the invention determines, using a sliding function derived by a variable structure system and FFT, whether chatters occur, and change rotational rate of a spindle of a machine tool, enabling the spindle to depart from a resonance area for chatter suppression. Additionally, the invention detects and suppresses chatters generated during, but is not limited to, a milling process. Practically, chatters generated by turning, reaming, grinding, or drilling can also be detected and suppressed.

In this embodiment of the invention, chatters are generated with determined whether retrieved milling signals generated by oscillation displacement (based on rotational rate or acceleration) during a milling process are high frequency signals and determined whether signal points generated by oscillation displacement (based on rotational rate or acceleration) during a milling process are located in a stable area derived using a sliding function. It is noted that chatters occur as both the determinations are achieved. Milling signals are obtained by converting oscillation displacement (based on rotational rate or acceleration) retrieved using a sensor during a milling process. The retrieved milling signals are converted to milling frequency for chatter determination.

With respect to determine whether retrieved milling signals are high frequency signals, it is implemented using FFT which is known and is omitted in the following for simplicity. Additionally, FFT comprises drawbacks as described above, thus the invention provides a second determination condition for enhanced accuracy.

In the following describes the process of determining whether signal points generated by oscillation displacement (based on rotational rate or acceleration) during a milling process are located in a stable area derived using a sliding function.

A milling process generates relative displacement between a milling tool and a workpiece, enabling plastic deformation and separate milling. The milling tool generates milling resistance (i.e. milling force). The milling force degree changes according to processing methods, milling tool quality, milling conditions (such as rotational rate of a spindle, feed rate, axial milling depth, radial depth, and so forth), workpiece materials and uniformity. A milling processing system is a complicated and non-linear dynamic system. As a result, a system model must be simplified and linearised and a milling system models is thus obtained according to non-deformed milling thickness. If dynamic milling force is ignored, the relation between milling force and non-deformed milling thickness may be a direct proportion, represented as:

$$F(t) = bk_c u(t) \tag{1},$$

where $F(t)$ represents milling force, b represents axial milling depth, $k_c$ represents milling resistance coefficient, and $u(t)$ represents non-deformed milling thickness.

If average milling depth is twice larger than oscillation displacement, the non-deformed milling thickness can be represented as:

$$u_0(t) = u_0(t) - [y(t) - \mu y(t-T)] \tag{2},$$

where $u(t)$ represents transient non-deformed milling thickness, $u_0$ represents average milling thickness, $\mu$ represents an overlapping factor and $0 \leq \mu \leq 1$ (indicating an overlapping degree of the front and rear oscillation ripples), and $y(t)$ represents oscillation displacement of a workpiece. The equation is then converted using Laplace transform, represent as:

$$u(s) = u_0(s) - [y(s) - \mu e^{-TS} y(s)] \tag{3}.$$

Milling force is acted to a workpiece to result in oscillation displacement between a milling tool of a spindle and the workpiece. If a system transfer function of a machine tool can represent a second order system, the function is represented as:

$$m\ddot{y}(t) + c\dot{y}(t) + ky(t) = F(t) \tag{4},$$

where $F(t)$ represents milling force, $y(t)$ represents oscillation displacement, and m, c, and k represent mass, a damped coefficient, and a elasticity coefficient, respectively, relating to a machine tool. Next, the equation is converted using Laplace transform, represent as:

$$ms^2 y(s) + csy(s) + ky(s) = F(s) \tag{5}$$

Next, an equation can be obtained according to equation (5), represented as:

$$\frac{y(s)}{F(s)} = \frac{1}{ms^2 + cs + k} = G_c(s). \tag{6}$$

Next, $F(s)$ is substituted for equation (1), represented as:

$$\frac{y(s)}{u(s)} = bk_c G_c(s). \tag{7}$$

A milling system model of an embodiment of the invention can be thus generated according to equations (6) and (7), as shown in FIG. 1, in which the dotted line represent a primary feedback operation and the bold line represent a regenerative feedback operation.

Next, milling force and oscillation displacement generated during a milling process using a machine act as inputs and outputs for system identification, with utilizing milling condition settings to obtain a system transfer function.

Milling conditions (such as rotational rate of a spindle or feed rate) cannot be arbitrarily determined, or milling load per edge of a milling tool may be excessive large or small. Excessive large milling load enables bursted milling tools or oscillation while excessive small milling load cannot well utilizes structure characteristics of a machine tool. As a result, the relation of rotational rate of a spindle and oscillation displacement is obtained according to average milling thickness and feed amount per edge.

Milling conditions, for example, comprise milling width as 6 (mm), milling depth as 2 (mm), and average milling thickness as 0.017 (mm).

A simultaneous equation of the relation of rotational rate of a spindle and feed rate is represented as:

$$t_{avg} = \frac{2}{\pi} \cdot f_t, \tag{8}$$

$$f_t = \frac{\pi}{2} \cdot t_{avg}, \tag{9}$$

and $$F = f_t \cdot N \cdot Z, \tag{10}$$

where $t_{avg}$ represents non-deformed milling thickness, $f_t$ represents feed amount per edge (mm/tooth) relating to a milling tool, N represents rotational rate (RPM) of a spindle, Z represents the number of milling edges, and F represents feed rate (mm/min).

Equation (8) represents the relation of non-deformed milling thickness and feed amount per edge. Next, a value of $t_{avg}$ is determined and substituted for equation (9) for feed amount per edge of a milling tool. Equation (10) represents the relation of rotational rate of a spindle and feed rate based on fixed non-deformed milling thickness, obtaining milling parameters for system identification. Thus, a system transfer function of a machine tool is obtained, represented as:

$$G(s) = \frac{Y(s)}{F(s)} = \frac{0.0936s^3 + 313.4s^2 + 7.191 * 10^5 s + 5.111 * 10^8}{s^4 + 3236s^3 + 1.467 * 10^7 s^2 + 2.303 * 10^{10} s + 3.115 * 10^{13}}, \tag{11}$$

where G(s) represents a system transfer function, F(s) represents system inputs (i.e. milling force (N)), and Y(s) represents system outputs (i.e. oscillation displacement (mm)).

Figure 2:
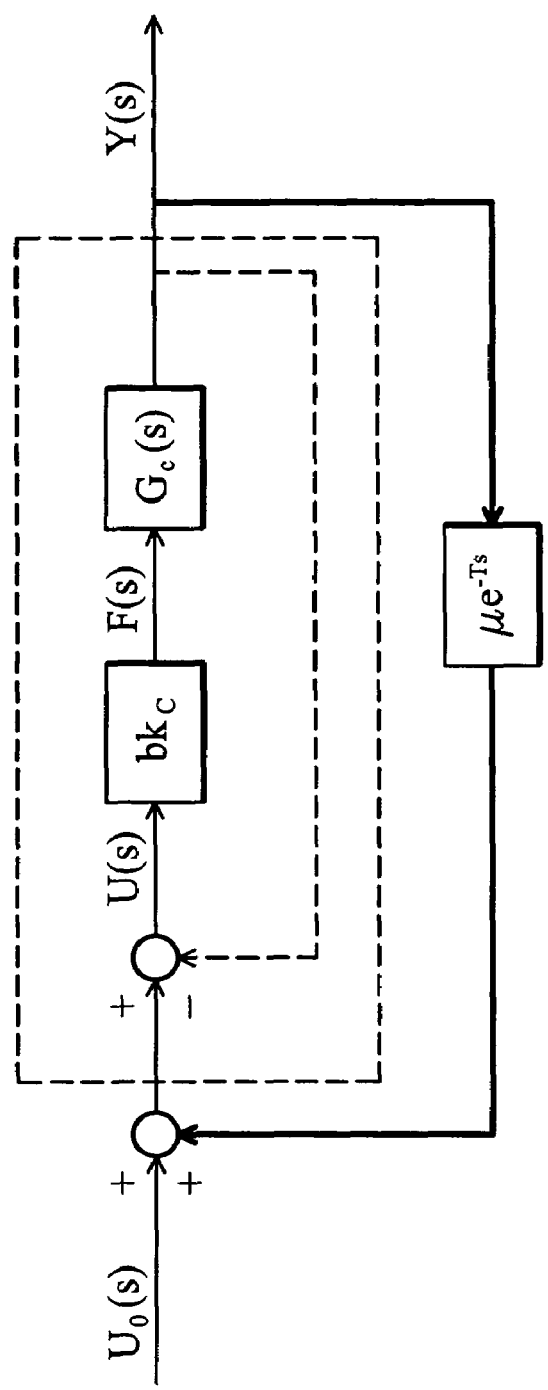
FIG. 2 is a schematic view of an embodiment of a sliding layer derived generated using a sliding function.

Referring to FIG. 2, a sliding surface S(x) is designed under the variable structure control, enabling sub-system switch and a milling system with respect to the sliding surface S(x) to reach a target zero point according to the sliding surface. During a sliding process, if a milling system departs from the sliding surface due to external force or other causes, it is forced to be slid back to the sliding surface utilizing sub-system switch. According to such characteristics, a phase may comprise a stable area and an unstable area. In stable area 100, the milling system is convergent but divergent. Unstable area 200 is outside stable area 100. The milling system may be divergent if it departs from stable area 100 to unstable area 200 with incapable of being slid back. Milling signals are continuously periodic signals, if chatters does not occur during a milling process, a milling system periodically runs in stable area 100, and, if chatters occur, the milling system is convergent on a phase plan, thus determined whether chatters occur accordingly.

A sliding surface can be derived from matrix transformation, feature structure assignment, Lyapunov theorem, pole placement, and so forth. In this embodiment, the sliding surface S(x) is derived from Lyapunov theorem.

As described, a system transfer function of a machine tool is represented as:

$$G(s) = \frac{Y(s)}{F(s)} = \frac{0.0936s^3 + 313.4s^2 + 7.191 * 10^5 s + 5.111 * 10^8}{s^4 + 3236s^3 + 1.467 * 10^7 s^2 + 2.303 * 10^{10} s + 3.115 * 10^{13}} \tag{12}$$

where F(s) represents system inputs (i.e. milling force (N)) and Y(s) represents system outputs (i.e. oscillation displacement (mm)).

A transfer function of a machine tool is defined, represented as:

$$G(s) = \frac{Y(s)}{F(s)} = \frac{a_1 s^3 + a_2 s^2 + a_3 s + a_4}{s^4 + b_1 s^3 + b_2 s^2 + b_3 s + b_4}. \tag{13}$$

Equation (13) is rewrote, represented as:

$$G(s) = \frac{Y(s)}{F(s)} = \frac{a_1 s^3 + a_2 s^2 + a_3 s + a_4}{s^4 + b_1 s^3 + b_2 s^2 + b_3 s + b_4} * \frac{N(s)}{N(s)}, \tag{14}$$

where N(s) represents an auxiliary state function, converted and represented as:

$$\begin{bmatrix} \dot{x}_1 \\ \dot{x}_2 \\ \dot{x}_3 \\ x_4^{(4)} \end{bmatrix} = \begin{bmatrix} 0 & 1 & 0 & 0 \\ 0 & 0 & 1 & 0 \\ 0 & 0 & 0 & 1 \\ -b_4 & -b_3 & -b_2 & -b_1 \end{bmatrix} \begin{bmatrix} x_1 \\ x_2 \\ x_3 \\ x_4 \end{bmatrix} + \begin{bmatrix} 0 \\ 0 \\ 0 \\ 1 \end{bmatrix} u \tag{15}$$

$$y = [a_4 \ a_3 \ a_2 \ a_1] \begin{bmatrix} x_1 \\ x_2 \\ x_3 \\ x_4 \end{bmatrix}.$$

Next, a sliding equation is obtained using Lyapunor theorem, represented as:

$$\begin{aligned} s &= cx \\ &= B^T P x \\ &= \begin{bmatrix} 0 \\ 0 \\ 0 \\ 1 \end{bmatrix}^T \begin{bmatrix} p_1 & p_2 & p_3 & p_4 \\ p_5 & p_6 & p_7 & p_8 \\ p_9 & p_{10} & p_{11} & p_{12} \\ p_{13} & p_{14} & p_{15} & p_{16} \end{bmatrix} \begin{bmatrix} x_1 \\ x_2 \\ x_3 \\ x_4 \end{bmatrix} \end{aligned} \tag{16}$$

$$= [p_{13} \quad p_{14} \quad p_{15} \quad p_{16}] \begin{bmatrix} x_1 \\ x_2 \\ x_3 \\ x_4 \end{bmatrix}.$$

Next, $p_{13}$, $p_{14}$, $p_{15}$, and $p_{16}$ are thus obtained, represented as:

$$p_{13} = -\frac{1}{2b_4} \quad (17)$$

$$p_{14} = -\frac{-b_1b_2^2 + b_2b_3 + b_1b_4 - b_1b_2b_4 + b_3b_4 - b_1b_4^2 - b_3b_4^2}{2b_4(-b_1b_2b_3 + b_3^2 + b_1^2b_4)}$$

$$p_{15} = -\frac{-b_1^2b_2 + b_1b_3 + b_1^2b_4 - b_1b_3b_4 - b_3^2b_4}{2b_4(-b_1b_2b_3 + b_3^2 + b_1^2b_4)}$$

$$p_{16} = -\frac{-b_1b_2b_4 + b_3 - b_1b_4 - b_3b_4 + b_2b_3b_4 - b_1b_4^2}{2b_4(-b_1b_2b_3 + b_3^2 + b_1^2b_4)}.$$

Next, equations (12) and (17) are substituted for equation (16), represented as:

$$s = cx = B^T P x = [p_{13} \quad p_{14} \quad p_{15} \quad p_{16}] \begin{bmatrix} x_1 \\ x_2 \\ x_3 \\ x_4 \end{bmatrix} \quad (18)$$

$$= \begin{bmatrix} -\frac{1}{2b_4} \\ -\frac{-b_1b_2^2 + b_2b_3 + b_1b_4 - b_1b_2b_4 + b_3b_4 - b_1b_4^2 - b_3b_4^2}{2b_4(-b_1b_2b_3 + b_3^2 + b_1^2b_4)} \\ -\frac{-b_1^2b_2 + b_1b_3 - b_1^2b_4 - b_1b_3b_4 + b_3^2b_4}{2b_4(-b_1b_2b_3 + b_3^2 + b_1^2b_4)} \\ -\frac{-b_1b_2b_4 + b_3 - b_1b_4 - b_3b_4 + b_2b_3b_4 - b_1b_4^2}{2b_4(-b_1b_2b_3 + b_3^2 + b_1^2b_4)} \end{bmatrix}^T \begin{bmatrix} x_1 \\ x_2 \\ x_3 \\ x_4 \end{bmatrix}$$

$$= [-1.6054*10^{-14} \quad -1515.33 \quad 1.1202 \quad -0.000500718] \begin{bmatrix} x_1 \\ x_2 \\ x_3 \\ x_4 \end{bmatrix}.$$

Thus, sliding function can be represented as:

$$s(x) = -1.60514*10^{-14}x_1 - 1515.33x_2 + 1.1202x_3 - 0.000500718x_4 \quad (19),$$

where $x_1$ represents oscillation displacement, $x_2$ represents a first order differential of $x_1$, $x_3$ represents a second order differential of $x_1$, and $x_4$ represents a fourth order differential of $x_1$.

The invention suppresses chatters by changing rotational rate of a spindle. A controller of a machine tool is an enclosed computer device, incapable of modifying milling parameters as activation. To modify rotational rate of a spindle immediately, the rotational rate is directly modified using a converter.

Figure 3:
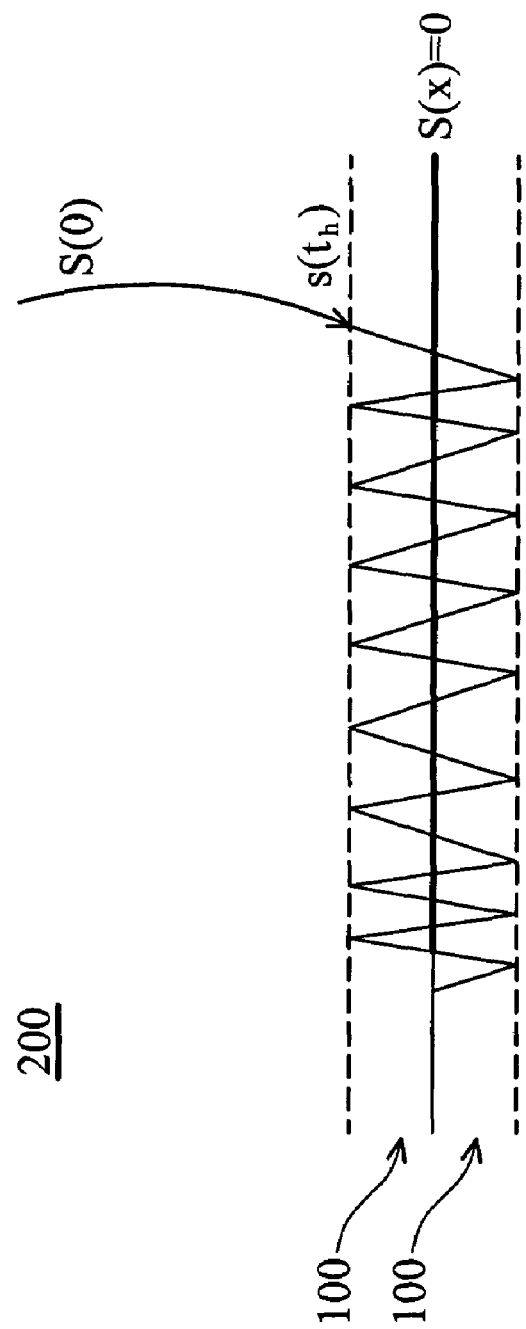
FIG. 3 is a schematic view of an embodiment of the structure of a detecting and suppressing control system.
Figure 4:
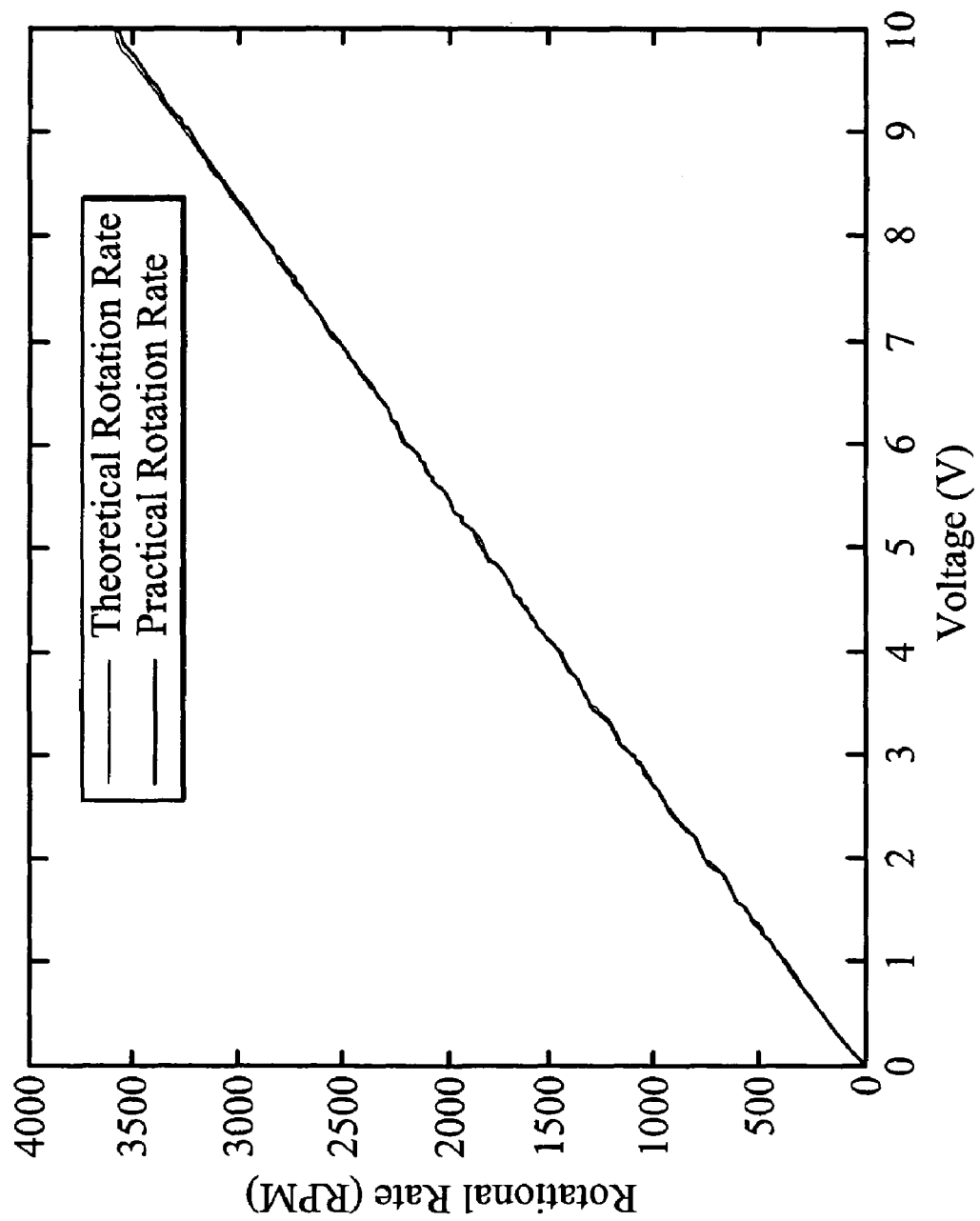
FIG. 4 is a schematic view of an embodiment of comparison between voltage and rotational rate relating to theoretical and practical rotation rates.

Referring to FIG. 3, controller 300 inputs rotational rate to converter 400 and spindle 500 retrieves control voltage of from converter 400. Rotational rate of spindle 500 comprises theoretical and practical rotational rates. The theoretical rotational rate is determined by input rotational rate while practical rotational rate is obtained by measuring spindle 500 using tachometer 600. linear relations relating to rotational rate of a spindle is obtained using curve fitting, represented as:

$$y = 360.5095x + 13.06 \quad (20), \text{ and}$$

$$z = 358.5026x + 21.2539 \quad (21),$$

where X represents control voltage (V), Y represents theoretical rotational rate (RPM) of a spindle, and Z represents practical rotational rate (RPM) of a spindle. Comparison between voltage and rotational rate relating to theoretical and practical rotation rates is shown in FIG. 4.

Figure 5:
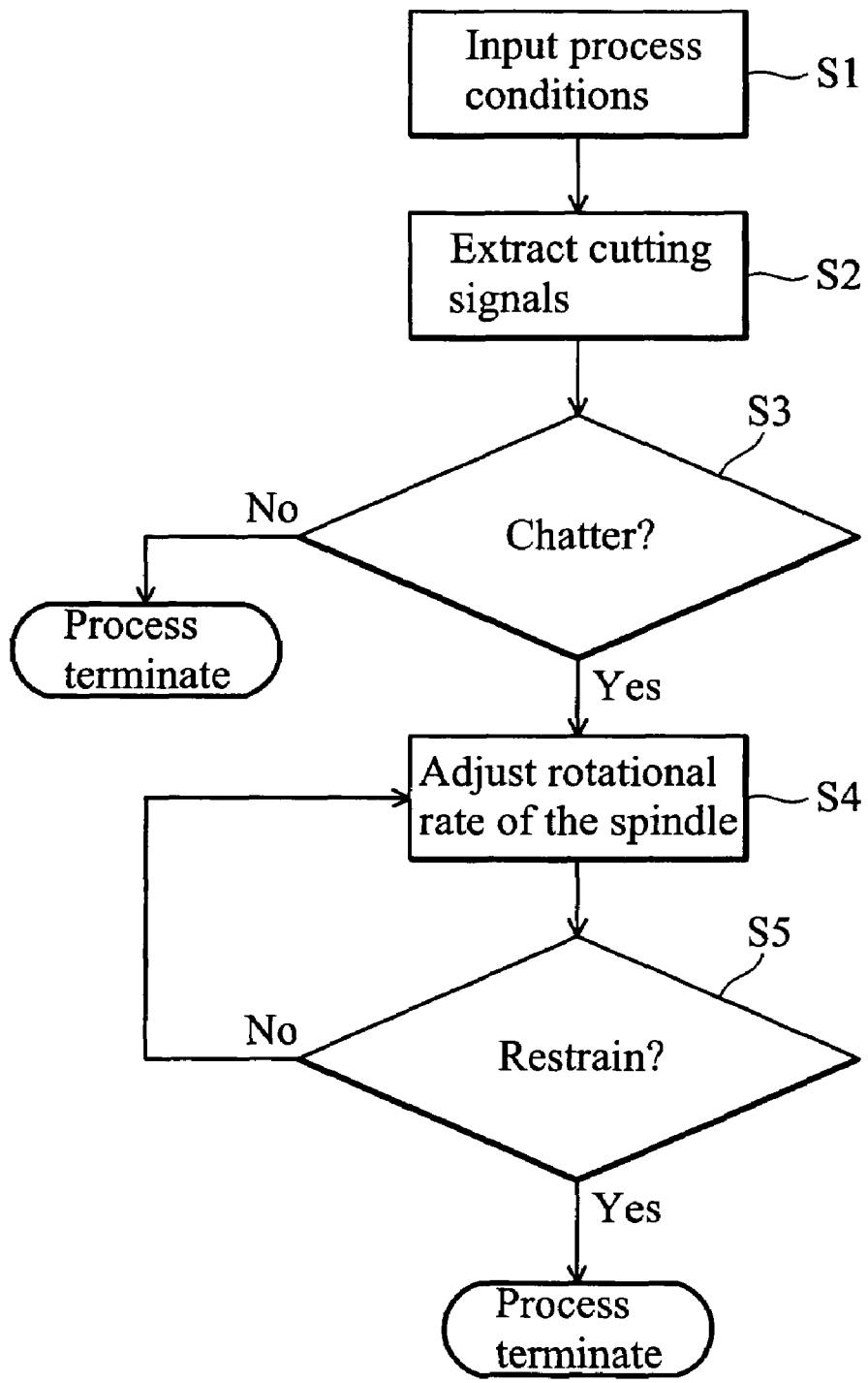
FIG. 5 is a flowchart of an embodiment of the detecting and suppressing control method for milling tool chatter.
Figure 6:
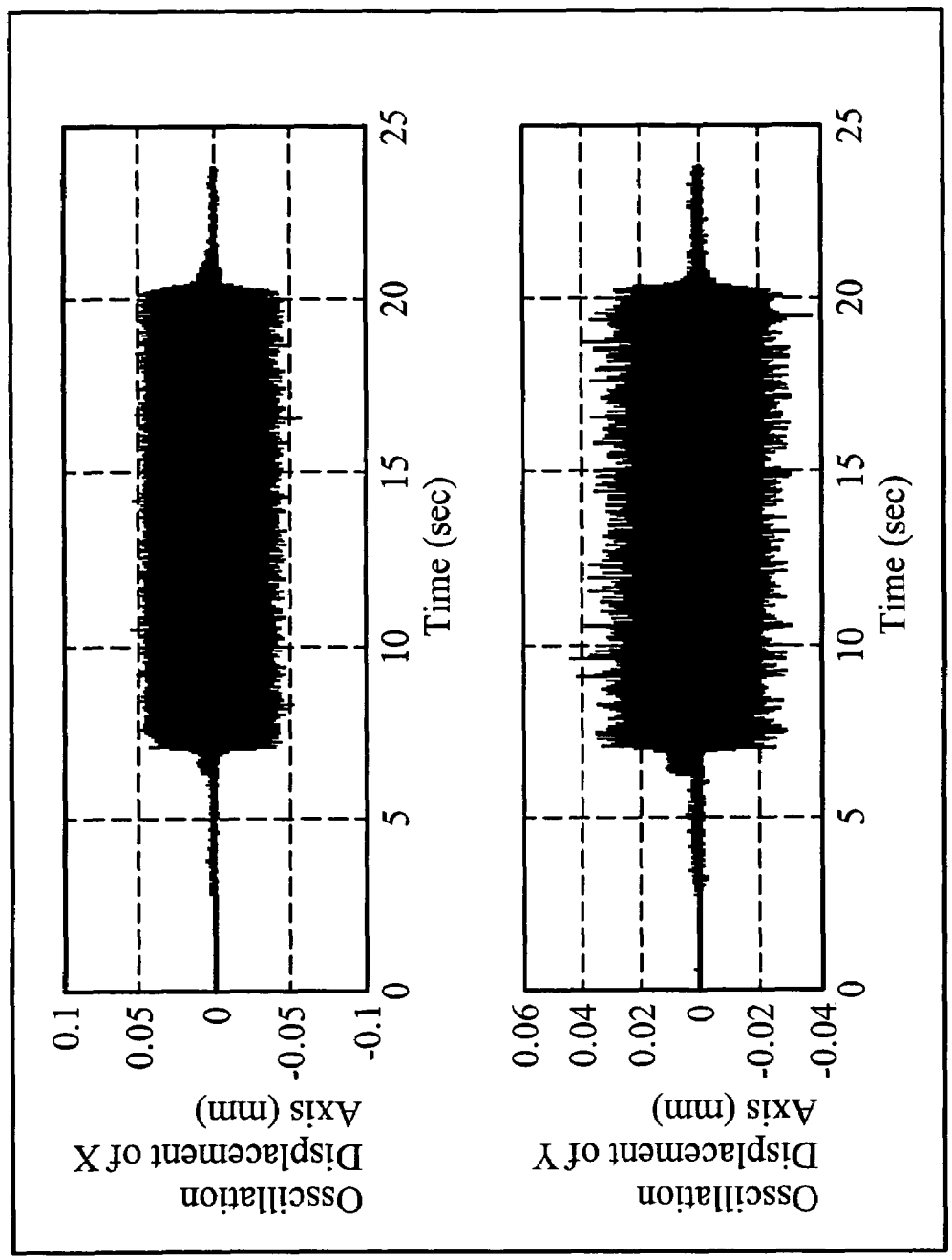
FIG. 6 is a schematic view of an embodiment of the relation between time and displacement relating to X and Y axes of a spindle with charter occurrence.
Figure 7:
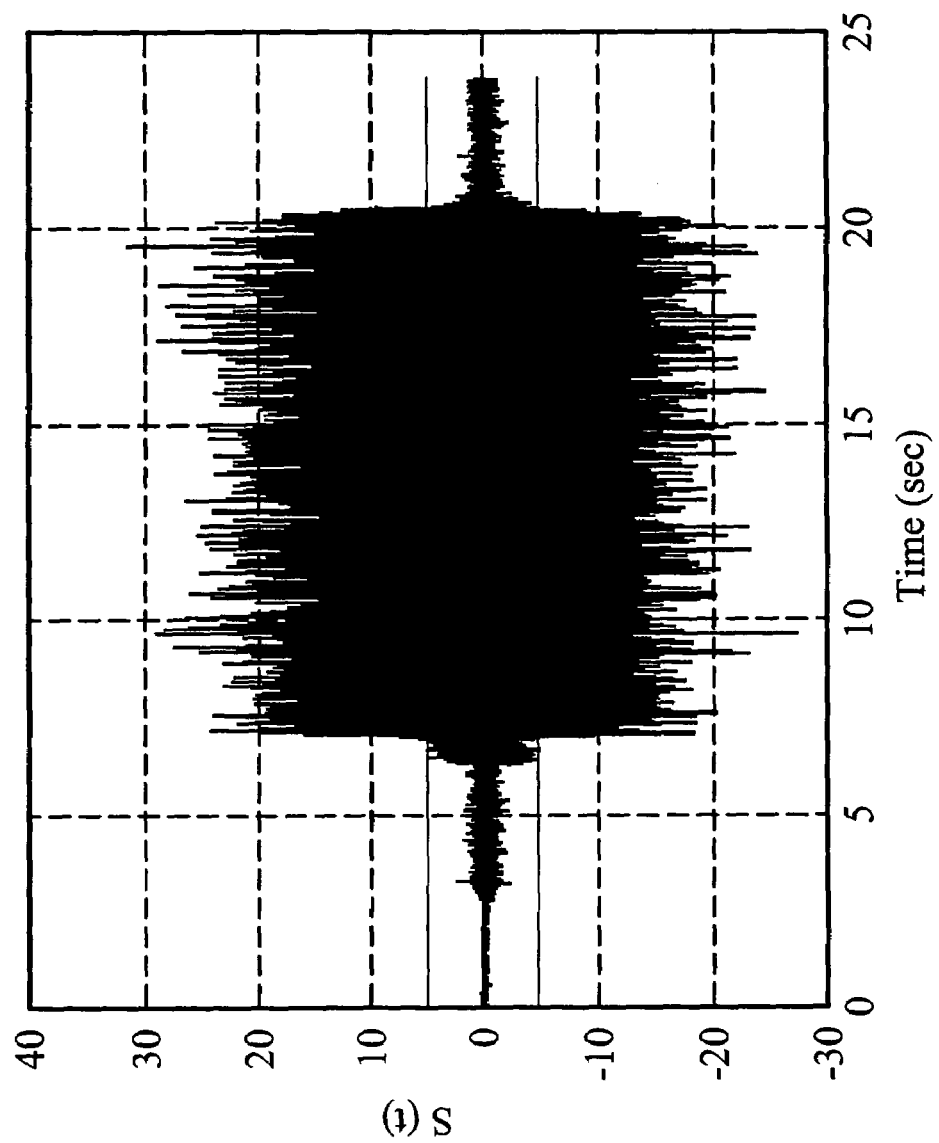
FIG. 7 is a schematic view of an embodiment of the relation between time and a sliding function based on oscillation displacement with charter occurrence.
Figure 8:
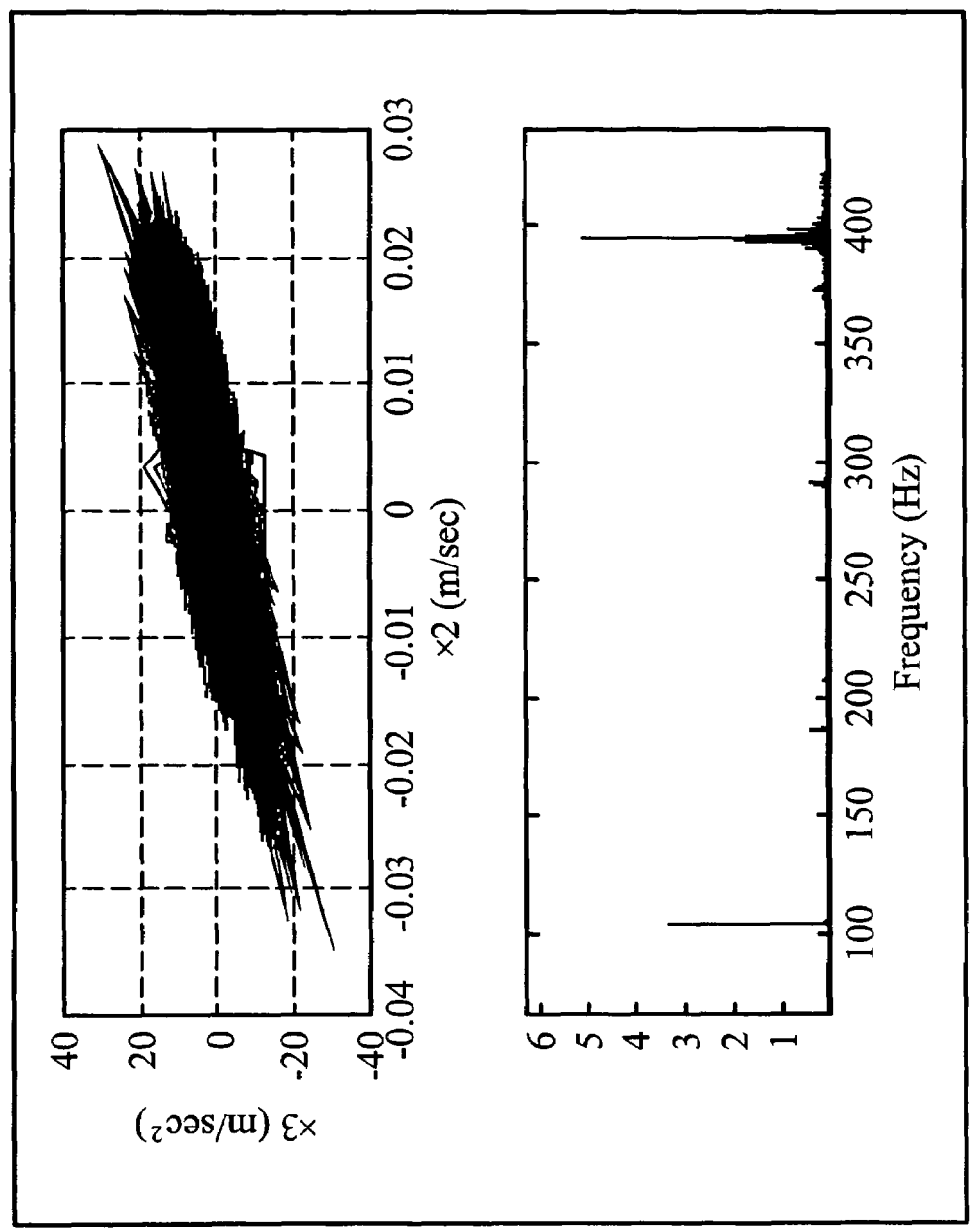
FIG. 8 is a schematic view of an embodiment of a phase plan and oscillation frequency spectra relating to X and Y axes of a spindle with charter occurrence.
Figure 9:
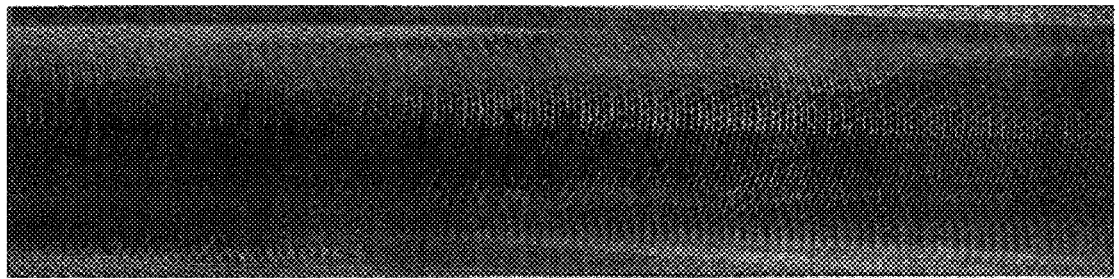
FIG. 9 is a schematic view of an embodiment of surface precision of a milled workpiece with charter occurrence.
Figure 10:
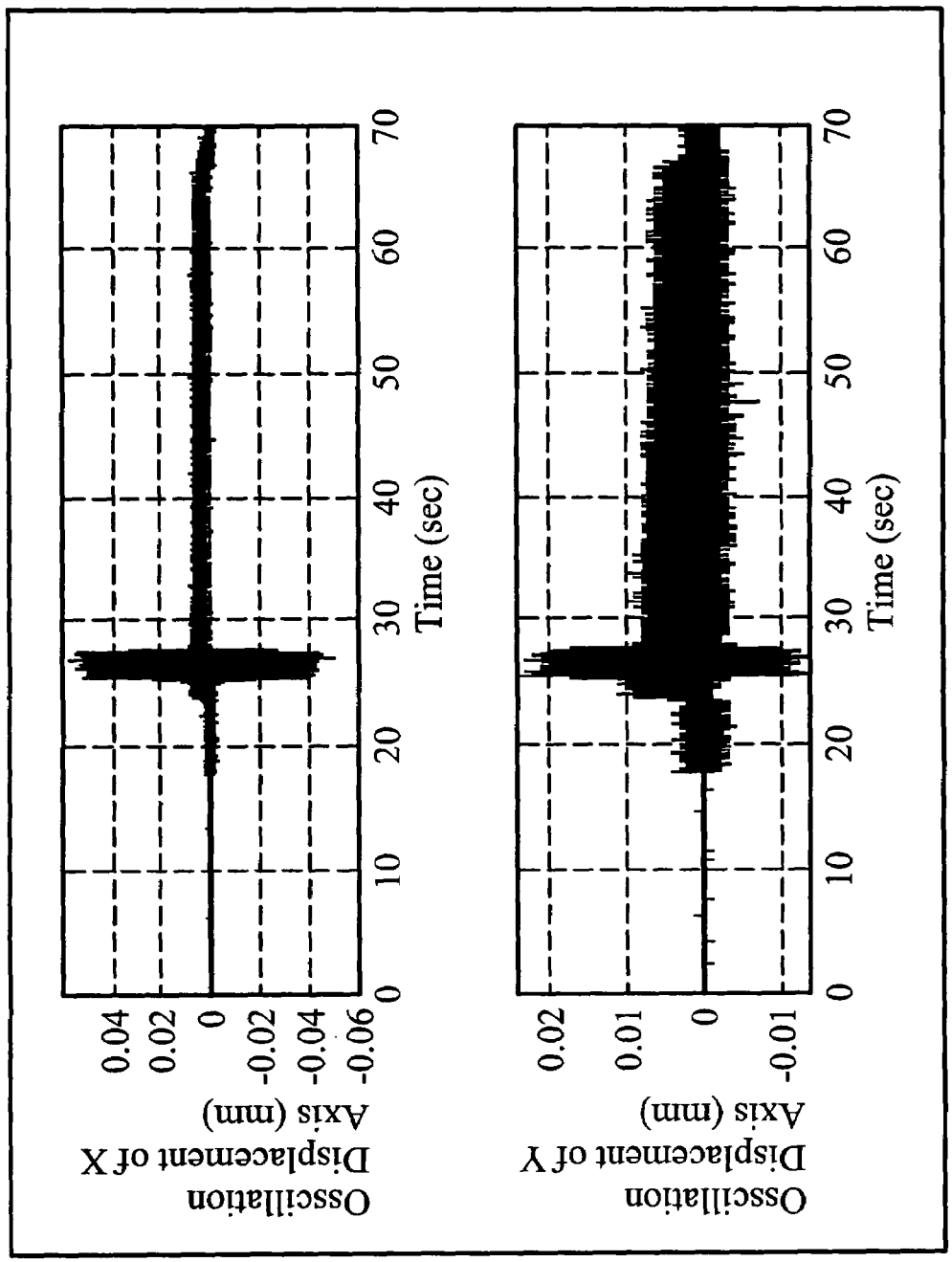
FIG. 10 is a schematic view of an embodiment of the relation between time and displacement relating to X and Y axes of a spindle with rotational rate reduction for chatter suppression.
Figure 11:
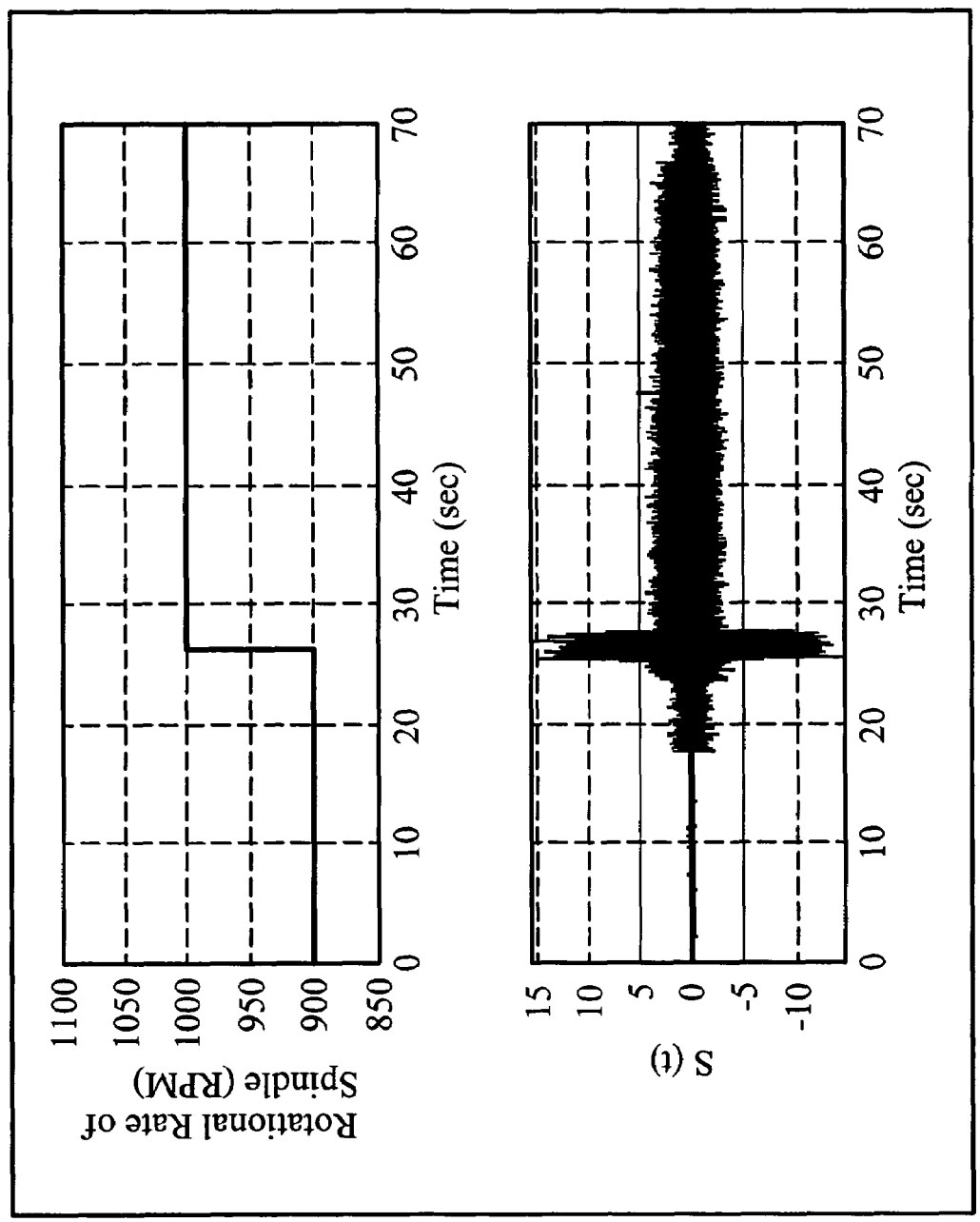
FIG. 11 is a schematic view of an embodiment of the relation between time and a sliding function based on oscillation displacement with rotational rate reduction for chatter suppression.
Figure 12:
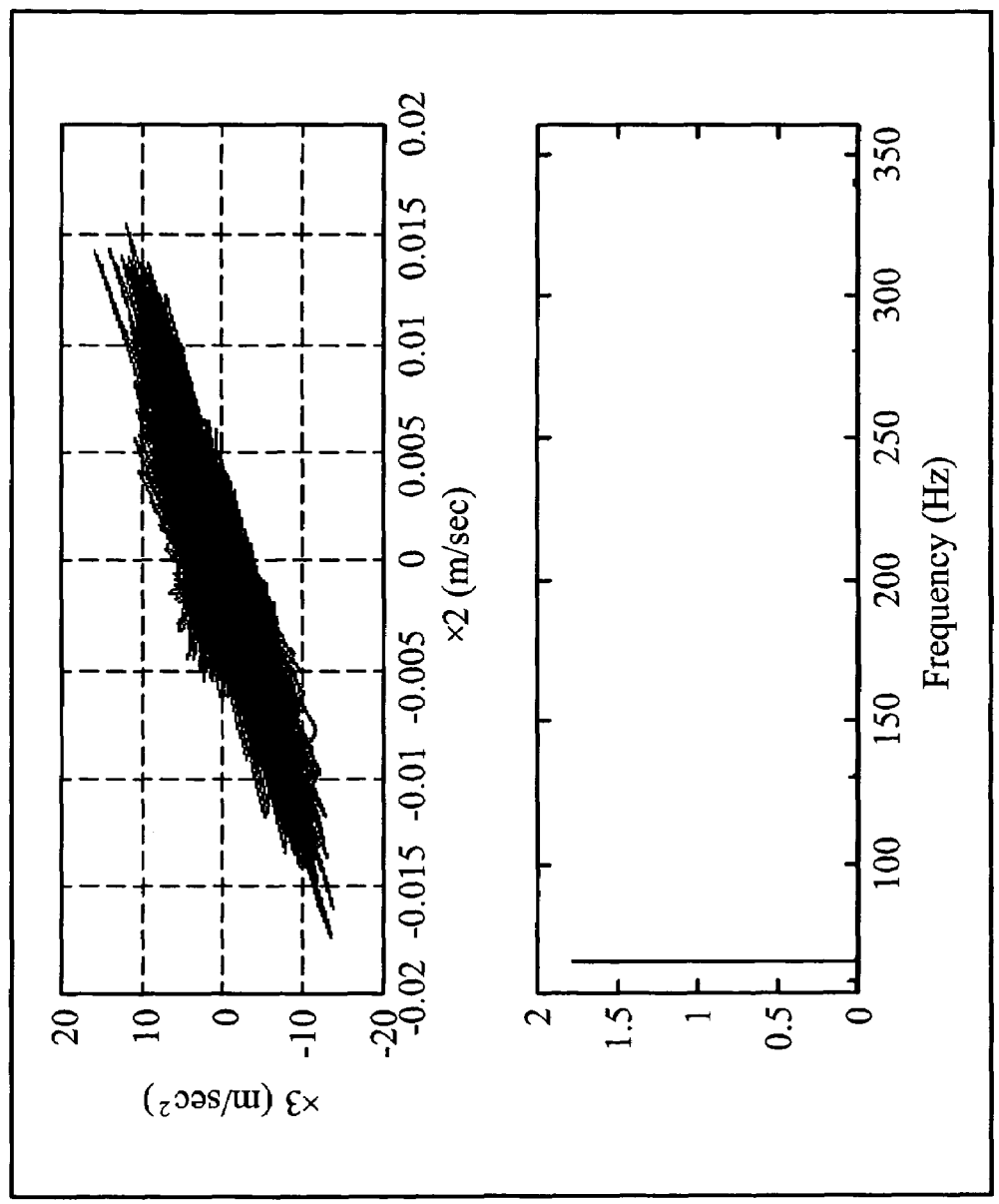
FIG. 12 is a schematic view of an embodiment of a phase plan and oscillation frequency spectra relating to X and Y axes of a spindle with rotational rate reduction for chatter suppression.
Figure 13:
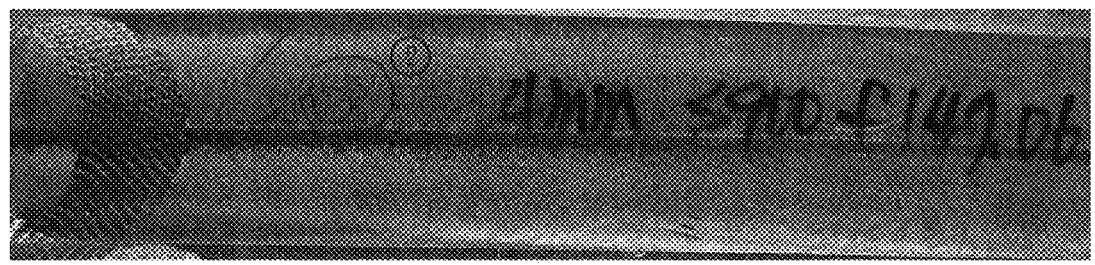
FIG. 13 is a schematic view of an embodiment of surface precision of a milled workpiece with rotational rate reduction for chatter suppression.
Figure 14:
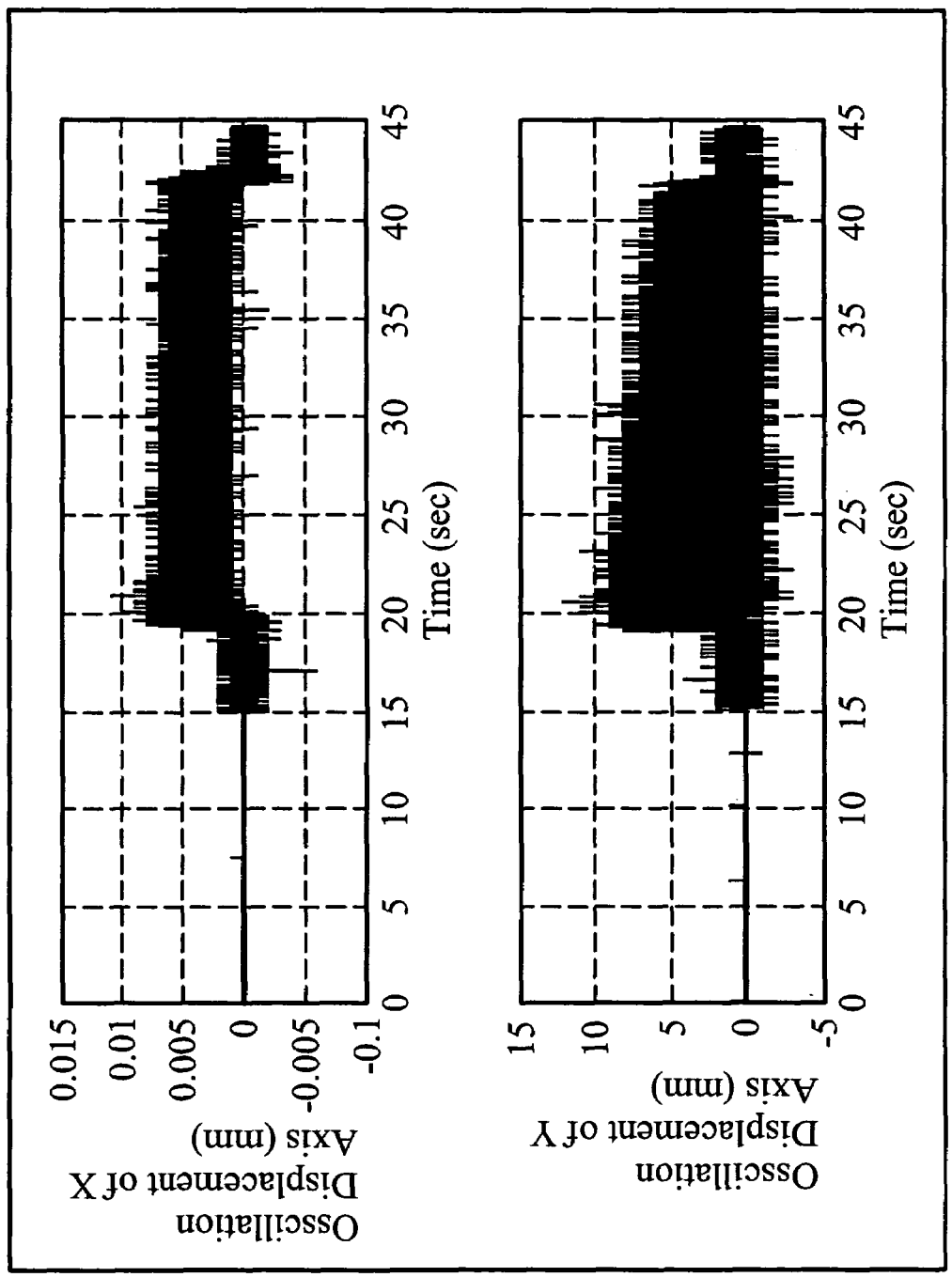
FIG. 14 is a schematic view of an embodiment of the relation between time and displacement relating to X and Y axes of a spindle with rotational rate increase for chatter suppression.
Figure 15:
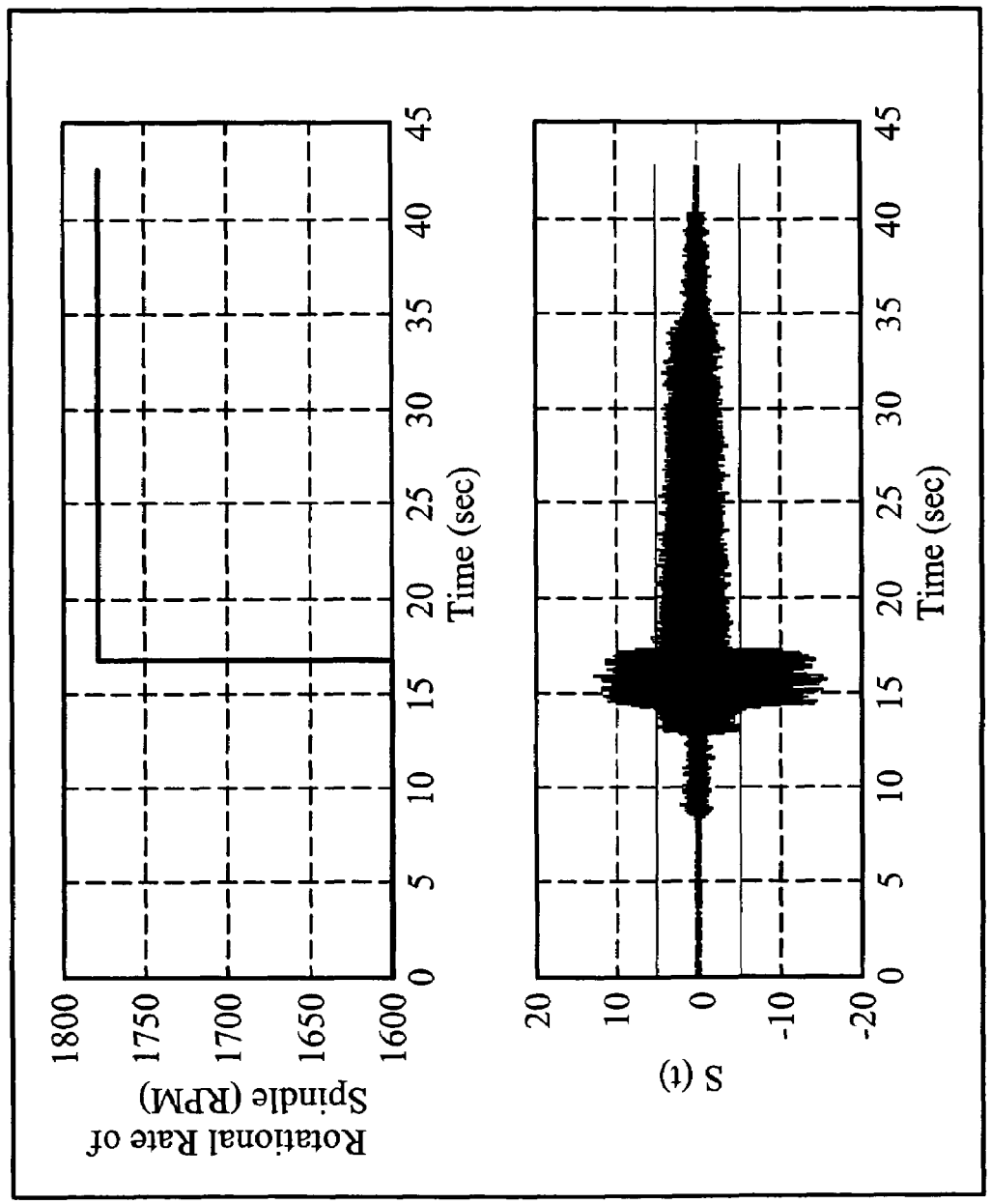
FIG. 15 is a schematic view of an embodiment of the relation between time and a sliding function based on oscillation displacement with rotational rate increase for chatter suppression.
Figure 16:
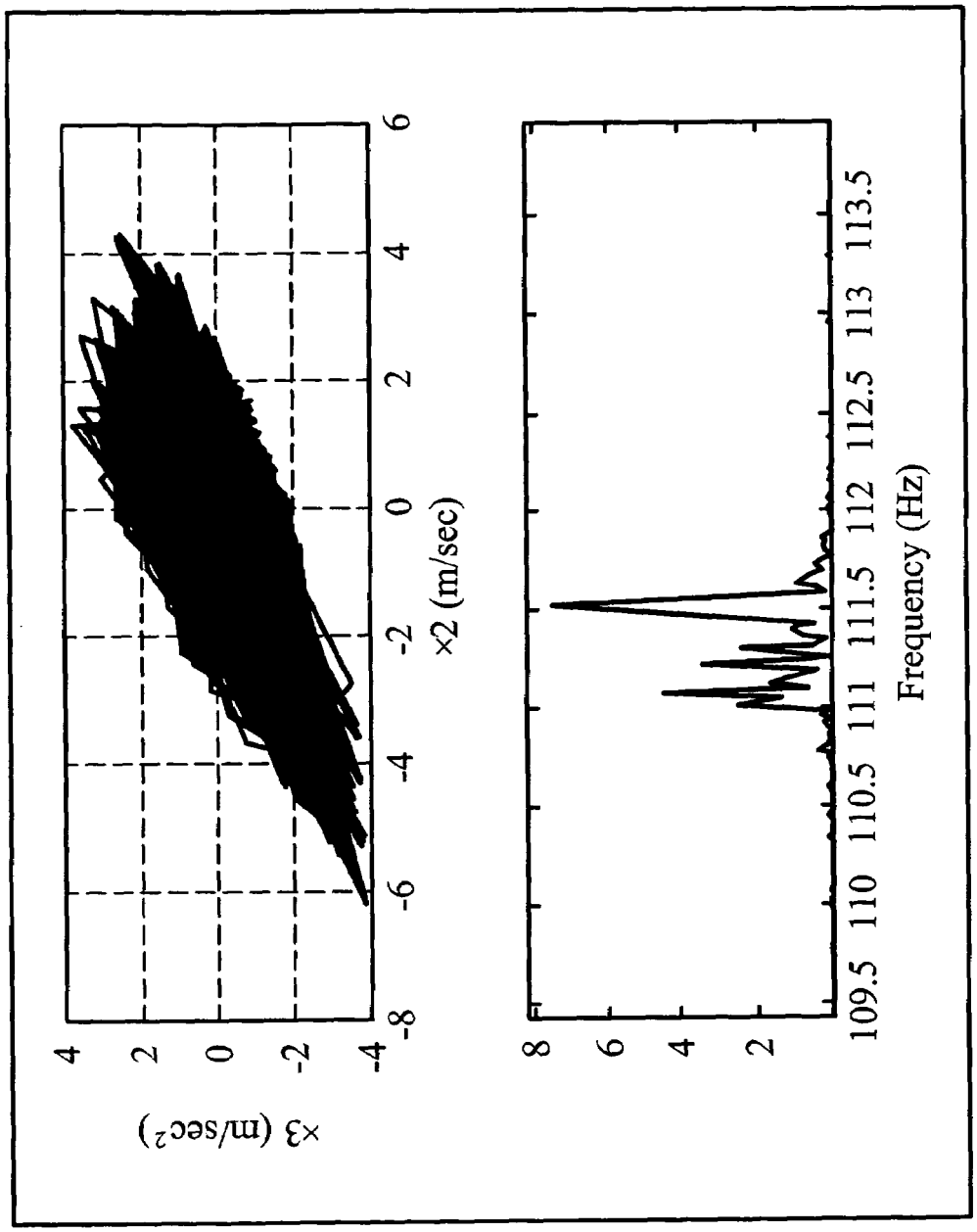
FIG. 16 is a schematic view of an embodiment of a phase plan and oscillation frequency spectra relating to X and Y axes of a spindle with rotational rate increase for chatter suppression.
Figure 17:
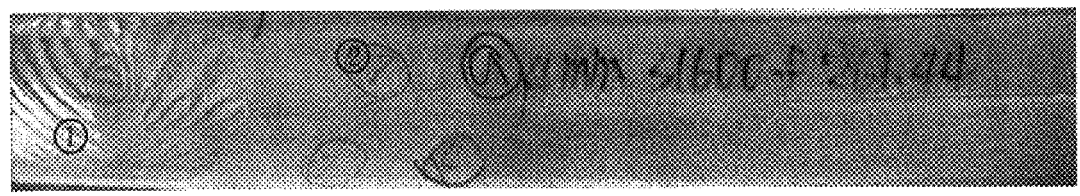
FIG. 17 is a schematic view of an embodiment of surface precision of a milled workpiece with rotational rate increase for chatter suppression.

FIG. 5 is a flowchart of an embodiment of the detecting and suppressing control method for milling tool chatter.

Milling parameters relating to a spindle of a machine tool are first defined and input to the machine tool (step S1). The machine tool is initiated using the milling parameters and starts to milling workpiece. Milling signals generated with oscillation displacement relating to the spindle occurring during a milling process are detected and extracted using a sensor installed on the machine tool (step S2). Next, it is determined whether chatters relating to the machine tool occur, comprising determining whether the milling signals are high frequency signals, and, if the milling signals are high frequency signals, determining whether signal points generated based on the milling signals are located in a stable area derived using a sliding function (step S3). If chatters occur, the process proceeds to step S4, and, if not, the process terminates.

If chatters occur, a chatter suppression system is initiated, enabling a converter to change rotational rate of the spindle (step S4), a control equation thereof represented as:

$$N_{new} = N*P \quad (22)$$

where N represents rotational rate (RPM) of a spindle, P represents desired percentage of rotational rate, and $N_{new}$ represents adjusted rotational rate (RPM) of a spindle.

It is determined whether chatters are suppressed (step S5). If chatters are suppressed, the process terminates, and, if not, the process goes to step S4.

Next, milling experiments are described for chatter suppression identification.

Default milling conditions comprise milling depth as 4 (mm), milling width as 6 (mm), rotational rate of a spindle as 1150 (RPM), and feed rate as 187.91 (mm/min). As a result, X and Y axial displacements of a spindle, generated sliding function values, a phase plan and corresponding oscillation frequency of the Y axis, and surface precision of a milled workpiece are shown in FIGS. 6~9 respectively. Surface roughness values of the milled workpiece are shown in Table 1.

TABLE 1

| Ra | Ry | Rz |
|---|---|---|
| 6.11 μm | 30.79 μm | 28.86 μm |

Milling conditions for rate reduction to suppress chatters comprise milling depth as 4 (mm), milling width as 6 (mm), rotational rate of a spindle as 900 (RPM), and feed rate as 147.06 (mm/min). As a result, X and Y axial displacements of a spindle, generated sliding function values, a phase plan and corresponding oscillation frequency of the Y axis, and surface precision of a milled workpiece are shown in FIGS. 10~13 respectively. Surface roughness values of the milled workpiece are shown in Table 2.

TABLE 2

| Suppression | Ra | Ry | Rz |
| --- | --- | --- | --- |
| Before | 4.68 μm | 22.96 μm | 22.96 μm |
| After | 0.82 μm | 5.83 μm | 5.05 μm |

Milling conditions for rate increase to suppress chatters comprise milling depth as 4 (mm), milling width as 6 (mm), rotational rate of a spindle as 1600 (RPM), and feed rate as 26.144 (mm/min). As a result, X and Y axial displacements of a spindle, generated sliding function values, a phase plan and corresponding oscillation frequency of the Y axis, and surface precision of a milled workpiece are shown in FIGS. 14~17 respectively. Surface roughness values of the milled workpiece are shown in Table 3.

TABLE 3

| Suppression | Ra | Ry | Rz |
| --- | --- | --- | --- |
| Before | 2.79 μm | 17.15 μm | 17.15 μm |
| After | 0.91 μm | 7.69 μm | 6.11 μm |

As described, milling chatters extremely affect surface roughness of a workpiece. Based on X and Y axial displacements, sliding function values, surface roughness values, and surface precision shown in FIGS. 9, 13, and 17, when chatters occur, the surface roughness value of Ra is 2~6. After the chatters are suppressed, the surface roughness value of Ra is 0.82~1, resulting in great improvement.

As described, milling chatters extremely affect surface roughness of a workpiece. Based on X and Y axial displacements, sliding function values, surface roughness values, and surface precision shown in FIGS. 9, 13, and 17, when chatters occur, the surface roughness value of Ra is 2~6. After the chatters are suppressed, the surface roughness value of Ra is 0.82~1, resulting in great improvement.

As described, milling chatters extremely affect surface roughness of a workpiece. Based on X and Y axial displacements, sliding function values, surface roughness values, and surface precision shown in FIGS. 9, 13, and 17, when chatters occur, the surface roughness value of Ra is 2~6. After the chatters are suppressed, the surface roughness value of Ra is 0.82~1, resulting in great improvement.

As described, milling chatters extremely affect surface roughness of a workpiece. Based on X and Y axial displacements, sliding function values, surface roughness values, and surface precision shown in FIGS. 9, 13, and 17, when chatters occur, the surface roughness value of Ra is 2~6. After the chatters are suppressed, the surface roughness value of Ra is 0.82~1, resulting in great improvement.

As described, milling chatters extremely affect surface roughness of a workpiece. Based on X and Y axial displacements, sliding function values, surface roughness values, and surface precision shown in FIGS. 9, 13, and 17, when chatters occur, the surface roughness value of Ra is 2~6. After the chatters are suppressed, the surface roughness value of Ra is 0.82~1, resulting in great improvement.

As described, milling chatters extremely affect surface roughness of a workpiece. Based on X and Y axial displacements, sliding function values, surface roughness values, and surface precision shown in FIGS. 9, 13, and 17, when chatters occur, the surface roughness value of Ra is 2~6. After the chatters are suppressed, the surface roughness value of Ra is 0.82~1, resulting in great improvement.

As described, milling chatters extremely affect surface roughness of a workpiece. Based on X and Y axial displacements, sliding function values, surface roughness values, and surface precision shown in FIGS. 9, 13, and 17, when chatters occur, the surface roughness value of Ra is 2~6. After the chatters are suppressed, the surface roughness value of Ra is 0.82~1, resulting in great improvement.

As described, milling chatters extremely affect surface roughness of a workpiece. Based on X and Y axial displacements, sliding function values, surface roughness values, and surface precision shown in FIGS. 9, 13, and 17, when chatters occur, the surface roughness value of Ra is 2~6. After the chatters are suppressed, the surface roughness value of Ra is 0.82~1, resulting in great improvement.

Although the present invention has been described in terms of preferred embodiment, it is not intended to limit the invention thereto. Those skilled in the technology can still make various alterations and modifications without departing from the scope and spirit of this invention. Therefore, the scope of the present invention shall be defined and protected by the following claims and their equivalents.

What is claimed is:

1. A computer assisted detecting and restraining system for cutting tool chatter, applied to a machine tool cutting a workpiece, comprising:

a network monitor system, further comprising a network camera and an audio module, wherein the network camera monitors the machine tool and the audio module receives audio caused as the machine tool cutting the workpiece;

a signal extraction system, further comprising a displacement meter and a dynamic signal extraction box, wherein the displacement meter extracts vibration displacement signals generated as a spindle of the machine tool cutting the workpiece and the dynamic signal extraction box converts the vibration displacement signals to digital signals and transfers the digitalized vibration displacement signals;

a chatter detection system, receiving the digitalized vibration displacement signals, determining whether the signals are high frequency signals, if the vibration displacement signals are high frequency signals, determining whether signal points generated based thereon are located in a stable area derived using a sliding function, and, if the signal points are located outside the stable area, sending a control command; and a chatter restraint system, receiving the control command and adjusting rotation rates of the spindle of the machine tool accordingly.

2. The computer assisted detecting and restraining system as claimed in claim 1, wherein the vibration displacement signals generated according to vibration displacement caused with resonance occurrence of the spindle are extracted using the displacement meter.

3. The computer assisted detecting and restraining system as claimed in claim 2, wherein the vibration displacement represents rotation rate or acceleration with the resonance occurrence of the spindle.

4. The computer assisted detecting and restraining system as claimed in claim 1, further comprising a converter, wherein the chatter restraint system sends a control command to the converter to decrease or increase the rotation rate of the spindle.

5. The computer assisted detecting and restraining system as claimed in claim 1, wherein, after rate adjustment is implemented, the chatter detection system repeats the determination operation and determines whether the control command is sent to the chatter restraint system according to determination results to re-adjust the rotation rate of the spindle.

6. The computer assisted detecting and restraining system as claimed in claim 1, wherein the signal extraction system further comprises a data extraction card, extracting the continuous vibration displacement signals.

7. The computer assisted detecting and restraining system as claimed in claim 1, wherein the displacement meter is installed at both sides of a fixture of the machine tool.

8. The computer assisted detecting and restraining system as claimed in claim 1, further comprising a network server and a client, wherein the client connects to the network server via a transmission medium to monitor cutting states of the machine tool through the network server and receive the audio generated during the cutting process through the audio module.

9. The computer assisted detecting and restraining system as claimed in claim 8, wherein the network server further comprises an operation interface, enabling the client to implement cutting settings and controls.

* * * * *